United States Patent [19]

Chmura

[11] 4,232,436
[45] Nov. 11, 1980

[54] POWDER METALLURGY PRODUCTION OF SPHERICAL ARTICLES, SUCH AS BEARING ELEMENTS

[75] Inventor: William J. Chmura, Southington, Conn.

[73] Assignee: Textron Inc., Providence, R.I.

[21] Appl. No.: 892,027

[22] Filed: Mar. 31, 1978

Related U.S. Application Data

[62] Division of Ser. No. 774,024, Mar. 3, 1977, Pat. No. 4,118,009, which is a division of Ser. No. 503,279, Sep. 5, 1974, Pat. No. 4,026,657.

[51] Int. Cl.³ .................................... B21H 1/14
[52] U.S. Cl. .................... 29/148.4 B; 308/241
[58] Field of Search ............... 29/148.4 B, 149.5 PM, 29/420.5; 308/72, 241; 403/122, 139; 251/315, 368

[56] References Cited

U.S. PATENT DOCUMENTS

| | | | |
|---|---|---|---|
| 1,656,508 | 1/1928 | Claus | 29/149.5 PM |
| 1,684,984 | 9/1928 | Claus | 29/149.5 PM X |
| 2,757,446 | 8/1956 | Boegehold et al. | 29/420.5 |
| 3,060,560 | 11/1962 | Biehl et al. | 29/420.5 |
| 3,192,607 | 7/1965 | Hilton | 29/149.5 PM |
| 3,205,027 | 9/1965 | Hilton | 29/149.5 B |
| 3,445,148 | 5/1969 | Harris et al. | 29/149.5 PM |
| 3,528,271 | 9/1970 | DiPonio | 29/148.4 R |
| 3,782,794 | 1/1974 | Chmura et al. | 308/193 |
| 3,832,763 | 9/1974 | Schober | 29/420.5 |
| 3,867,751 | 2/1975 | Connell et al. | 29/420.5 |
| 4,026,657 | 5/1977 | Chmura | 29/149.5 PM |
| 4,059,879 | 11/1977 | Chmura et al. | 29/420.5 |
| 4,118,009 | 10/1978 | Chmura | 251/315 |

Primary Examiner—Francis S. Husar
Assistant Examiner—V. K. Rising
Attorney, Agent, or Firm—Hopgood, Calimafde, Kalil, Blaustein & Lieberman

[57] ABSTRACT

Low-cost articles characterized by a surface of revolution, such as truncated spherical balls, e.g., plain spherical bearing balls, are provided made by the powder metal compaction and sintering of blanks followed, in the case of ball elements, by densification of the outer spherical surface by mechanical working, such as by roll-forming, the balls so produced being characterized by improved sphericity and dimensional tolerance and improved wear resistance combined with optimum resistance to corrosion. The spherical surface of the ball is substantially free of pores, has a work hardened structure and has a density at and adjacent the surface of at least about 95% of the theoretical density of the metal, the density substantially below the surface being less and ranging to as low as at least about 70% of theoretical density.

4 Claims, 12 Drawing Figures

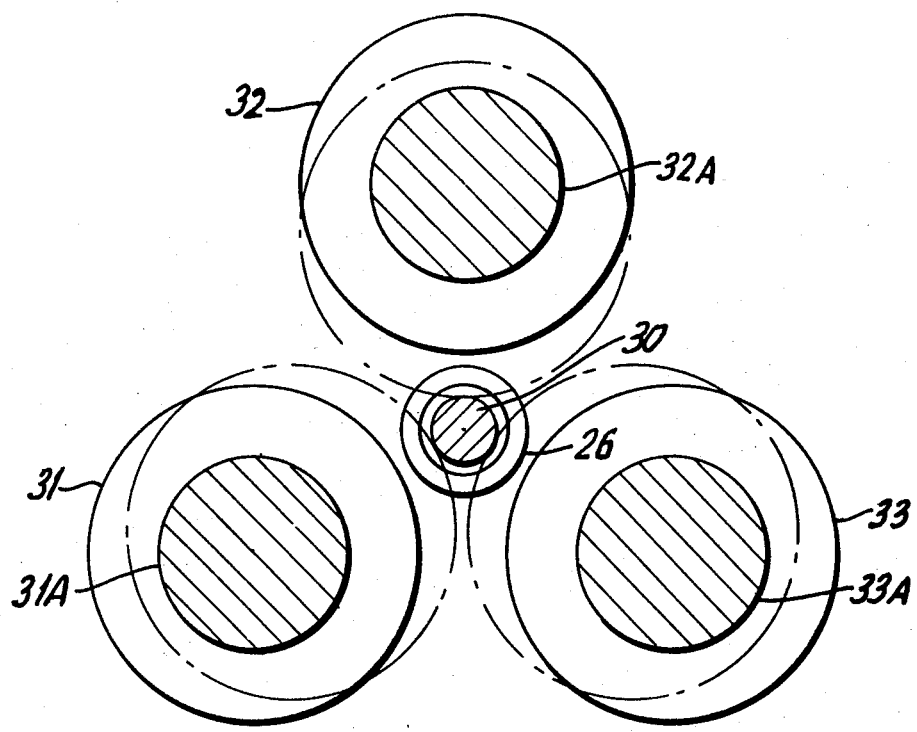
FIG. 6
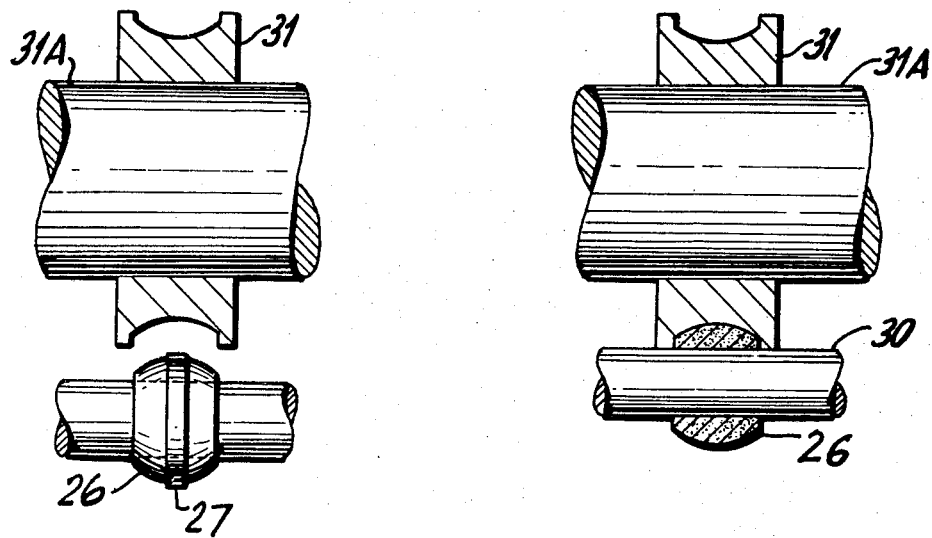
FIG. 7
FIG. 8

POWDER METALLURGY PRODUCTION OF SPHERICAL ARTICLES, SUCH AS BEARING ELEMENTS

This is a division of copending application Ser. No. 774,024 filed Mar. 3, 1977 and now U.S. Pat. No. 4,118,009, which in turn is a division of Ser. No. 503,279 filed Sept. 5, 1974 and now U.S. Pat. No. 4,026,657.

This invention relates to the production of sintered powder metallurgy articles characterized by a surface of revolution, for example, truncated balls, such as spherical bearing balls and to self-aligning spherical bearing assemblies produced therefrom. The invention also relates to a powder metallurgy method of producing low-cost spherical bearings.

STATE OF THE ART

It is known to produce truncated spherical balls by machining rough blanks from metal tubing or bar stock for use in bearing assemblies, ball valves and the like. In one method, the bore of the blank is filled with a low-melting lead-base alloy (e.g. an alloy known in the trade as Cerrobase), the prepared ball blanks ground en masse to the desired sphericity, the lead-base filler alloy being thereafter removed from the bore by melting and the bore then finish ground. Truncated balls produced in this manner are costly and the method employed somewhat time-consuming. Moreover, there is considerable waste of material due to machining.

It is also known to produce truncated spherical bearing balls for self-aligning bearings by powder metallurgy. That is to say, metal powder is pressed to substantially the desired shape, otherwise known as a preform, the preform sintered in a non-oxidizing atmosphere at an elevated temperature. The sintered preform may be finished by grinding to improve dimensional quality, the dimensions of the preform being such as to require very little metal removal during grinding. The advantages of this process are that high metal yields are obtained since very little metal is wasted.

Powder metallurgy methods for producing truncated spherical bearing balls are disclosed in U.S. Pat. Nos. 1,656,508, 1,684,984, 3,205,027 and 3,192,607. The bearing balls disclosed in these patents are porous and are adapted to be self-lubricating. In this connection, reference is made to U.S. Pat. No. 3,205,027 which discloses the production of spherical bearing balls for use in self-aligning pillow blocks. The ball is preformed of conventional powdered metals, such as compositions containing 90% copper and 10% tin; 77.5% copper, 7.5% tin and 15% lead; 25% copper and 75% iron, and the like. The preforms are sintered in a conventional manner to result in a product having a sponge-like character. The balls are conventionally employed for self-lubricating bearings in that they are porous and can contain approximately 25% by volume of lubricating oil in the tiny interconnected pores of the preform. This type of bearing is generally known as "Olilite" bearings. A powder metallurgy method for producing bearing rings is disclosed in U.S. Pat. No. 3,782,794 which issued on Jan. 1, 1974.

However, spherical balls of the foregoing type present problems when used in bearing assemblies of the dry bearing type. For example, bearing assemblies of the sliding type in which the truncated bearing ball is enclosed within an outer-ring member utilizing a low friction fabric liner (e.g. woven TEFLON cloth or TEFLON filaments and the like supported in a plastic matrix), the outer-ring member having a conforming concaved spherical face which mates with the convexed spherical outer face of the inner-ring or truncated ball. (TEFLON is the trademark for polytetrafluoroethylene resin.) This structure results in a sliding rotational interface between the two mating or matching bearing faces. Because the sintered spherical balls produced by powder metallurgy are porous throughout, the surface of the ball tends to be subject to corrosion during use due to the amount of exposed area characteristic of the porous surface and, moreover, tests have shown that fabric liners run against such surfaces are particularly sensitive to wear. Since sintered bearing balls may be plunged ground to size, the surface tends to have an open structure which further lowers the resistance to wear and corrosion. Moreover, small metal fragments may remain in the pores after grinding and later aggravate plastic liners. It is important that the ball have a high degree of sphericity as poor sphericity results in camming, increased torque, decreased misalignment, etc. Poor sphericity also compounds the problem of swaging or the wrap-around method employed in applying the fabric liner to the ball.

Thus, it would be desirable to provide a relatively low-cost spherical bearing made by powder metallurgy which overcomes the foregoing problems and which is commercially useful.

Objects of the Invention

It is an object of the present invention to manufacture a high performance truncated ball, such as a spherical bearing ball, utilizing low-cost high production powder metallurgy methods of compaction and sintering characterized by improved resistance to wear and corrosion, and further characterized by improved geometry as compared to P/M parts in only the as-compacted and sintered condition.

Another object of the present invention is to provide a powder metallurgy method of producing truncated spherical balls, such as spherical bearing balls, in which the spherical surface of the sintered powder preform is markedly densified by mechanical working, such as by roll forming, whereby the spherical bearing surface is substantially pore-free and work hardened as compared to P/M balls in which the spherical surface is ground and characterized by an open structure.

A further object is to provide as an article of manufacture a truncated spherical ball enclosed in an outer-ring and characterized in that the spherical bearing surface of the ball is characterized by a high density zone at or near the surface thereof as compared to the more porous structure obtained when a sintered P/M ball is surface ground following sintering.

A still further object of the invention is to provide an improved ball joint construction.

Another object is to provide a sintered powder metallurgy article characterized by a surface of revolution wherein said surface is mechanically worked to a high density.

These and other objects will more clearly appear when taken in conjunction with the following disclosure and the accompanying drawings, wherein:

FIGS. 6 to 8 are illustrative of one embodiment of mechanically working the P/M blank by roll forming;

STATEMENT OF THE INVENTION

Stating it broadly, the invention provides a powder metallurgy article of manufacture formed from a sintered powder metal blank characterized by a surface of revolution taken about a fixed axis passing through said article, the surface of revolution of said article being mechanically worked to a high density of at least about 95% of the theoretical density of said sintered metal blank. The density of the article in cross section preferably, though not necessarily, decreases from a highly dense zone adjacent said surface of revolution to a density level approaching said axis of at least about 70% of theoretical density, said cross section being taken substantially centrally of said article.

As a preferred embodiment, the invention provides as an article a spherical ball element, such as a truncated ball element, formed from a sintered powder metal blank having a bore passing therethrough (e.g. a cylindrical or polygonal bore), the spherical convex surface of said element being similarly highly mechanically worked as described hereinabove to provide a work hardened zone of high density at and immediately adjacent the surface. The average density of said zone as stated above is at least about 95% of the theoretical density of the metal, the surface being substantially free of pores. Preferably, though not necessarily, the remaining portion of the sintered metal outside the dense zone and inwardly of said spherical surface may be relatively porous compared to the dense region and thus may have an average density ranging from about 70% to less than about 95% of said theoretical density of the metal and, more preferably, about 80% to 90%. The dense zone at and adjacent the spherical surface conforms substantially to a wrought metal surface and confers improved resistance to wear and corrosion to the resulting bearing.

As stated hereinbefore, spherical bearings are normally produced by machining the desired shape from wrought metal bar stock or tubing. Production rates obtained with this method are usually limited by the intrusion of cutoff and/or drilling and/or grinding operations. In producing spherical bearings by machining and grinding operations, material loss may range anywhere from 20% to 65% by weight depending upon the final size of the truncated ball. The machined part is later heat treated, ground and assembled with other components to form the bearing.

The invention, on the other hand, provides economic advantages in the production of spherical balls in that the powder metallurgy method employed enables the utilization of almost 100% of the starting material, while providing production rates substantially exceeding those attained by conventional operations. For example, P/M blanks can be compacted from powder and sintered at very high rates and machines are available to mechanically work or roll form the spherical surface at up to 1800 pieces per hour.

POWDER METAL COMPACTIONS

Figures 2, 3, 4:
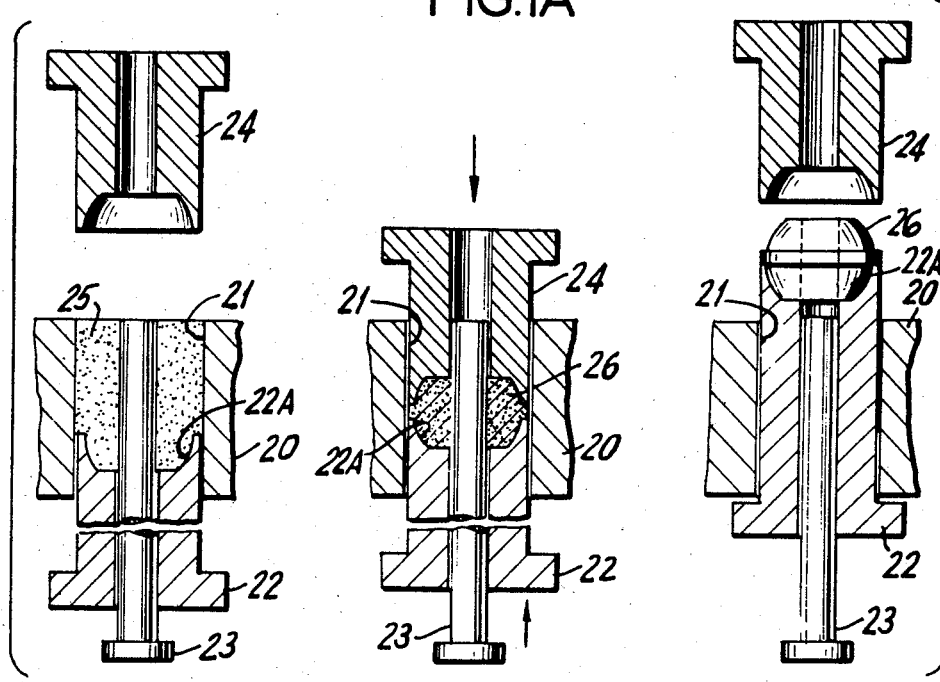
FIGS. 2, 3 and 4 show schematically the various compaction stages employed in the manufacture of P/M spherical bearing balls.

A preferred method which may be employed in producing the spherical bearing is illustrated schematically in FIGS. 2 to 4. FIG. 2 shows a die assembly comprising a die 20 having a cavity 21 therein with a lower punch 22 entering the bottom of the die, the punch having a central opening with a core rod 23 passing therethrough of diameter corresponding to the diameter of the cylindrical bore of the spherical bearing to be produced. The lower punch has a spherical cavity 22A corresponding to one-half of the spherical contour of the bearing. An upper die 24 is similarly provided having a central opening for receiving core rod 23, the upper punch also having a spherical cavity corresponding to the other half of the spherical contour of the bearing. When the two punches are inserted from opposite ends of the die cavity 21, with the core rod passing through both punches, the cavities of the two punches together define the entire shape of the spherical bearing.

Referring to FIG. 2, loose metal powder 25 (e.g. metal powder, for example steel, such as 316 stainless) is fed to the die as shown while the lower punch and core rod are in place. The upper punch applies the pressure needed to produce the preform 26 (FIG. 3), the preform being then ejected as shown in FIG. 4 by removing upper punch 24 and by raising lower punch 22 to a position to enable removal of the part.

Figure 5:
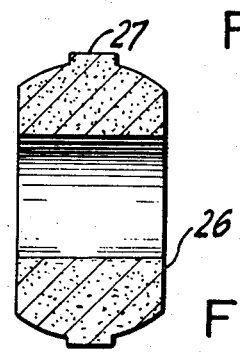
FIG. 5 is a typical P/M bearing ball blank produced by the method illustrated by FIGS. 2 to 4.

A cross-section of the preform blank 26 (in this case stainless steel) produced using the foregoing method is shown in FIG. 5. As will be noted, the blank is characterized by an equatorial flat 27 which will be later removed or contoured by roll forming. Flats of different geometries and sizes have been produced on P/M balls. However, all tend to reduce the true and total sphericity of the part and thus are unacceptable in fabric lined spherical bearing applications. The blank at this stage of manufacture has a porosity which may range from about 70% to 90% of the theoretical density of the steel composition.

Thus, the steel powder composition is compacted into a blank or preform of density ranging from about 70% to 90% of the theoretical density of the metal, the blank then sintered under substantially non-oxidizing and noncarburizing conditions at an elevated temperature (e.g. 2050° F.).

POWDER TYPE AND ALLOY

The types of metal or steel powder used are preferably selected according to those which are economically attractive as well as those which are the most practical for the application intended. The powder composition may comprise a mixture of elemental powders. Generally, such mixtures tend to result in composition heterogeneity. However, this may be beneficial since such compositions tend to be incompletely alloyed during sintering and thereby provide ductile areas which inhibit brittle fractures from forming in the porous regions of the material. Pre-alloyed powders, however, can also be used such as those produced by atomization from a liquid melt.

This invention is applicable to a wide variety of metals, such as copper and copper-base alloys (e.g. brass, bronze, and the like), aluminum and aluminum-base alloys, steel (e.g. stainless steel) and other metals.

Examples of P/M steels which have been tested include a nickel steel containing 4% nickel; 304 S.S. containing 0.08% max C, 2% max Mn, 1% max Si, 18% to 20% Cr, 8% to 12% Ni and the balance essentially iron; 316 S.S. containing 0.08% max C, 2% max Mn, 1% max Si, 16% to 18% Cr, 10% to 14% Ni, 2% to 3% Mo and the balance essentially iron; 410 S.S. containing 0.15% max C, 1% max Mn, 0.5% max Si, 11.5% to 13% Cr and the balance essentially iron. The P/M results were compared to wrought 440C S.S. containing 0.95% to 1.2% C, 1% max Mn, 1% max Si, 0.04% max P, 0.03% max S, 0.75% max Mo, 16% to 18% Cr and the balance essentially iron.

FORMING OF THE SPHERICAL SURFACE

Following the production of the sintered blank by powder metallurgy in accordance with the invention, the convex spherical face of the blank is mechanically cold worked to provide a high density bearing surface. Preferably, this is done by roll-forming using an apparatus of the type, for example, shown in FIGS. 6, 7, and 8. However, it is understood that any apparatus can be employed that will densify the convex spherical surface on the sintered blank.

Since P/M materials generally exhibit low tensile ductility, it is important that precautions be taken during the mechanical working operation, especially roll forming, to insure that the work is applied to the preform carefully, otherwise, stress cracks may form at the mechanically worked spherical surface.

Referring to the schematic of FIG. 6, an end view of support mandrel 30 is shown on which is mounted preform 26, the mandrel having radially disposed about at substantially 120° intervals three roll formers 31, 32 and 33 mounted on rotatable shafts 31A, 32A and 33A. The rotatable shafts are adapted to move towards the preform and bear against it, the roll formers having a peripheral groove of substantially spherical curvature designed to produce the finished spherical surface on the preform. This is shown more clearly in the partial view in elevation depicted in FIG. 7 which shows roll former 31 mounted on shaft 31A spaced from preform 26 mounted on mandrel 30. As the rolls approach the preform (note the dotted lines of the rolls in FIG. 6), pressure is applied via the peripheral spherical grooves of the rolls while the roll forms are rotating, causing metal on the surface of the preform to compress and work harden. This is shown in FIG. 8 which shows roll former 31 in full and mating contact with truncated preform 26, the equatorial flat 27 shown in FIG. 7 having been smoothened out to provide a precision made spherical bearing surface of high density.

A preferred method embodiment of the invention resides in providing a sintered porous truncated spherical blank or preform of density ranging from about 70% to 90% of the theoretical density of the metal. A highly dense zone is mechanically worked into the surface of the truncated spherical bearing ball having an average density of at least about 95% of the theoretical density of the metal, the remaining portion of the ball below the dense zone preferably having an average density of about 70% to 90%.

Figure 9:
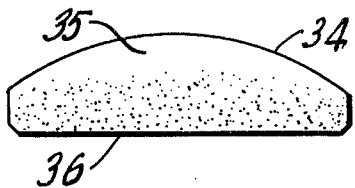
FIG. 9 is a representative of a photomacrograph taken at 3.5 times magnification of a cross section of a finished P/M bearing in which the surface has been mechanically worked to densify it compared to the more porous area below the surface.

A cross section of a segment of a spherical bearing is shown in FIG. 9 which is representative of a photomacrograph taken at 3.5 times magnification, the segment being designated by the numeral 34 depicting a highly dense zone 35 at and below the spherical surface of the bearing segment, the region below the zone approaching what would be the surface 36 of the bore being noticeably porous. The dense zone generally has a density of at least about 95% of theoretical density while the porous region near the bore being at least 70% dense, the average density for the porous region below the dense surface ranging from about 70% to 90% of theoretical density. The dense zone near and at the convex surface of the truncated spherical bearing makes up at least about 10% of the cross-sectional thickness of the bearing measured from the crown of the spherical surface to the side of the bore. As will be noted from FIG. 9, the dense zone as measured from the crown towards the base is approximately 30% of the total cross-sectional thickness. The highly cold worked surface need not be deep so long as the porosity of the surface is substantially removed and has a density at and just below the surface of at least about 95% and preferably at least about 98% of theoretical density.

An advantage of roll-forming the spherical surface of the bearing element is that a very high smoothness is obtained of less than about 16 RMS (root mean square) and characterized by high hardness. This is important in assuring the desired resistance to wear. In the case of a bearing element made from 316 stainless steel by powder metallurgy, the hardness gradient of the cross section after roll forming may range from a high of 33 or 34 $R_c$ to below 22 $R_c$ approaching the bore, the hardness adjacent the bore being as low as 88 $R_B$ (8.5 $R_c$). It is clearly apparent that roll-forming produces very high hardness at the surface of the bearing element. The hardness is obtained as a microhardness reading by taking actual reading of the sintered particles and thus avoid the pores.

Another advantage of roll-forming is the markedly improved tolerance of the final element. Roll-forming applied to wrought elements tends adversely to affect tolerance due to bulk movement of metal, thereby causing dimensional changes, whereas, the opposite is true in the roll-forming of porous blanks.

Following the production of the highly densified surface, for example, from heat treatable steel, the mechanically worked sintered blank may be subjected to heat treatment, if desired, by heating it to an austenitizing temperature preparatory to quench hardening. A carburizing procedure may be introduced if required prior to this heat treatment. This heating further augments and strengthens the sintering bonds. However, certain compositions need not be heat treated, such as 316 stainless steel. If desired, a finish grinding operation can be performed but it is generally not needed.

ARTICLES UTILIZING THE TRUNCATED BALL

Figure 1:
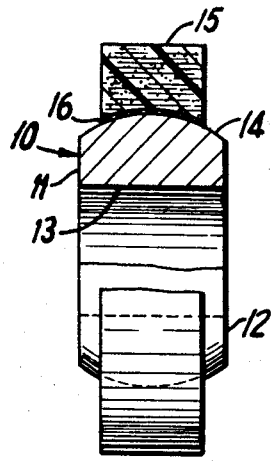
FIG. 1 depicts a typical self-aligning spherical bearing comprising a truncated ball enclosed within an outer-ring characterized by a low-friction fabric-type lining.

An example of an article of manufacture utilizing the ball element is the self-aligning bearing shown in FIG. 1 which is a partial section showing truncated spherical bearing ball 10 having truncated sides 11, 12 and a cylindrical bore 13 passing therethrough, the spherical surface 14 of the ball being enclosed within outer annular ring 15 comprising a fabric-type plastic element having a low-friction liner 16 of synthetic filament, e.g. TEFLON (trademark for polytetrafluoroethylene resins), adhering to the outer-ring and in mating contact with spherical surface 14 of the spherical bearing. However, the outer ring may be made of metal to provide a metal-backed self-aligning bearing of improved tolerance.

Figure 1A:
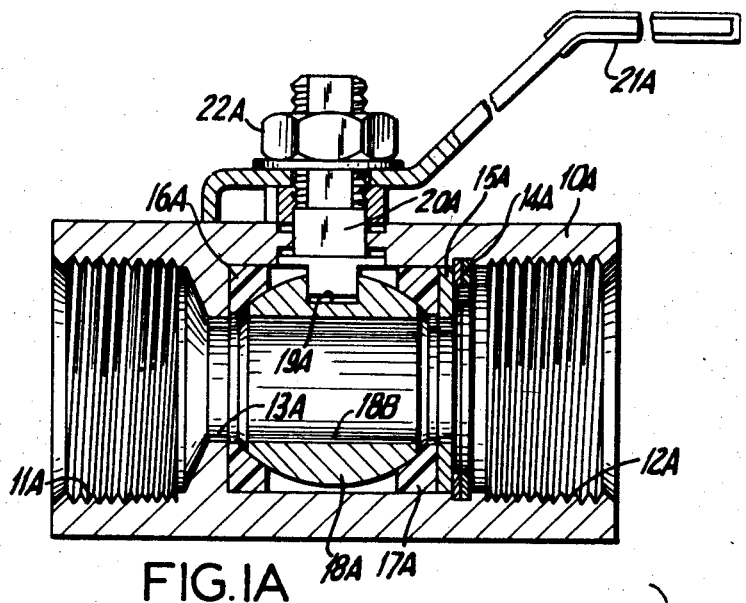
FIG. 1A illustrates a ball valve utilizing the truncated spherical ball of the invention.

Another article utilizing the truncated ball element is the ball valve shown in FIG. 1A comprising valve body 10A having opening 11A at one end and opening 12A at its opposite end, an annular shoulder 13A being located inwardly of opening 11A as shown. Located inwardly from opening 12A is an annular ring 14A mounted in annular groove 14B, a washer 15A being held adjacent said annular ring. Thus, a valve chamber is defined between annular shoulder 13A and said washer containing spaced apart annular valve seats 16A, 17A of suitable material, e.g. glass-filled TEFLON (registered trademark), buna rubber and the like, which support ball element 18A having a recess 19A which receives valve stem 20A, said valve stem being coupled to handle 21A via handle fastening nut 22A. The bore 18B of the ball element is adapted by the turn of the handle to align coaxially with openings 11A, 12A and, by a further turn of the handle, to seal off the openings. The closing off of the surface pores of the ball element using our method prevents gas or liquid leakage, while providing an economical ball element for such applications.

In effect, the two articles of manufacture referred to hereinabove have in common the fact that they are ball joints formed of a cooperating element with a curved surface held substantially in contact with a conforming ball element to permit relative motion between the two elements, whether the ball joint is a plain spherical bearing, a ball valve or similar article.

BEARING PROPERTIES

As stated hereinbefore, plunged ground P/M surfaces are disadvantageous in that the surfaces have an open structure due to the porosity of the preform and, because of this porosity, the bearing elements exhibit poor resistance to wear. Thus, it is desirable that the surface of the P/M preform be as close as possible to the precision surface of a wrought bearing element. The importance of a high density surface will be apparent by referring to the graph of FIG. 10 which relates wear as a function of porosity, 0% porosity being that of a wrought stainless steel bearing element, while the porous elements were made by powder metallurgy to provide porosities ranging up to about 20%.

Figure 11:
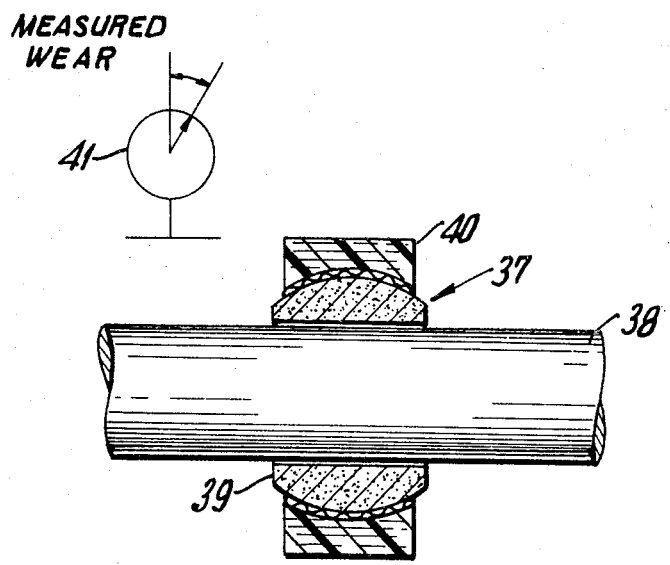
FIG. 11 is a schematic of a wear tester employed in obtaining the data illustrated in FIG. 10.

The test is conducted as shown schematically in FIG. 11 which depicts a bearing assembly 37 comprising a one-half inch shaft 38 supporting a sintered truncated spherical bearing 39 enclosed within an outer-ring 40 of a fabric-lined bearing in which the liner formed of a TEFLON/NOMEX/resin combination is in contact with the spherical surface. As stated earlier, TEFLON is the trademark for polytetrafluoroethylene. NOMEX is the trademark for high temperature aromatic polyamids. The outside diameter of the truncated spherical bearing is about ¾ inch.

A load of 6830 lbs. is applied to the outer ring as shown and the amount of wear measured using a dial 41 shown schematically in FIG. 11. The speed of oscillation at ±25° is 10 cycles per minute at room temperature. The total wear at the end of 25,000 cycles (a back and forth movement is one cycle) is determined and this value is used as a comparison.

The comparison is based on a wrought (0% porosity) versus a porous surface and is independent of the composition of the steel tested. One sintered P/M steel element was surface ground and was about 7% porous, another P/M ball element had a ground surface and was about 12% porous, and a third P/M ball element surface ground had a porosity of about 17%.

Figure 10:
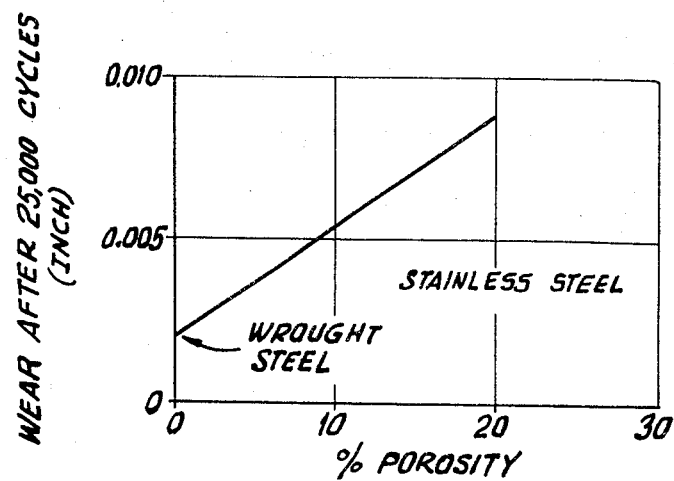
FIG. 10 is a graph relating wear to porosity after 25,000 cycles of oscillations of ±25° under a bearing load of 6830 pounds comparing the wear of a ground surface P/M blank to the wear of a spherical ball produced from wrought stainless steel.

Referring to FIG. 10, it will be noted from the average curve that the total wear on a 100% dense surface (the wear is the combination of the fabric liner of the outer-ring and the surface of the bearing element) is about 0.002 inch. Using the data from the curve at 10% porosity, the total wear is about 0.006 inch (i.e. three times as much). At 20% porosity, the average wear is about 0.009 inch (or more than four times the wear of a 100% dense surface).

Tests have shown that the ideality of a smooth wrought surface can be substantially attained using P/M elements provided that the spherical surface of the sintered P/M bearing element is mechanically worked so as to make it at least about 95% dense, and preferably at least about 98% dense.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A method for producing a powder metallurgy article of manufacture characterized by a convex surface of revolution which comprises, forming a sintered porous powder metal blank having said surface of revolution formed about a fixed axis passing through said blank having an average density ranging from about 70% to 90% of the theoretical density of the metal, and then mechanically working by roll forming substantially said entire convex surface of revolution of said article sufficient to produce a highly dense mechanically worked zone at and adjacent said convex surface of average density of at least about 95% of theoretical density of the metal with the pores at the surface thereof substantially closed, while maintaining the remaining portion of the sintered metal inwardly of the dense zone and extending towards said axis substantially porous and having an average density ranging from about 70% to less than 95% of the theoretical density of the metal.

2. A method for producing a truncated spherical ball element by powder metallurgy which comprises, forming a sintered porous powder metal blank of average density ranging from about 70% to 90% of the theoretical density of the metal in the shape of a truncated ball element with a bore passing therethrough, and then mechanically working by roll forming substantially the entire spherical surface of said ball to produce a highly dense mechanically worked zone at and adjacent said spherical surface of average density of at least about 95% of theoretical density of the metal with the pores at the surface thereof substantially closed, while maintaining the remaining portion of the sintered metal inwardly of the dense zone and extending to the bore substantially porous and having an average density ranging from about 70% to less than 95% of the theoretical density of the metal.

3. The method of claim 2, wherein the surface of the ball element is mechanically worked by roll-forming and wherein the highly dense zone has a thickness of at least about 10% measured from the crown of the surface to the side of the bore.

4. The method of claim 2, wherein the spherical surface is roll-formed to provide a highly dense zone of average density of at least about 98% of the theoretical density of the metal and wherein the remaining portion of the sintered metal below the dense zone has an average density of about 80% to 90% of the theoretical density of the metal.

* * * * *